Dec. 24, 1957    J. B. CUNNINGHAM ET AL    2,817,417
AUTOMATIC INJECTION LUBRICATOR
Filed Jan. 21, 1954    2 Sheets-Sheet 1

WITNESSES:

INVENTORS
Charles A. Murphy and
Jerry B. Cunningham
BY
Paul E. Friedmann
ATTORNEY Dec. 24, 1957   J. B. CUNNINGHAM ET AL   2,817,417
AUTOMATIC INJECTION LUBRICATOR
Filed Jan. 21, 1954                             2 Sheets-Sheet 2
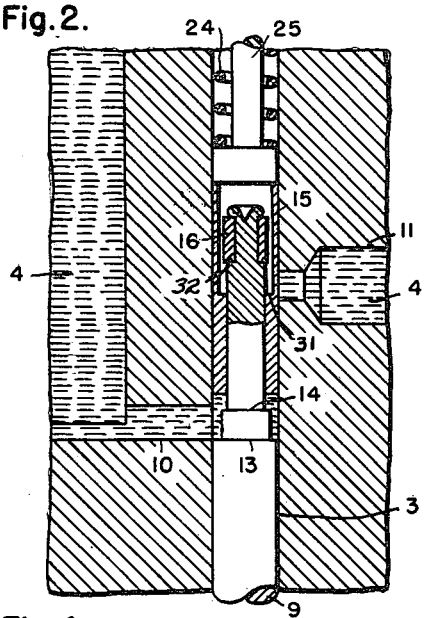
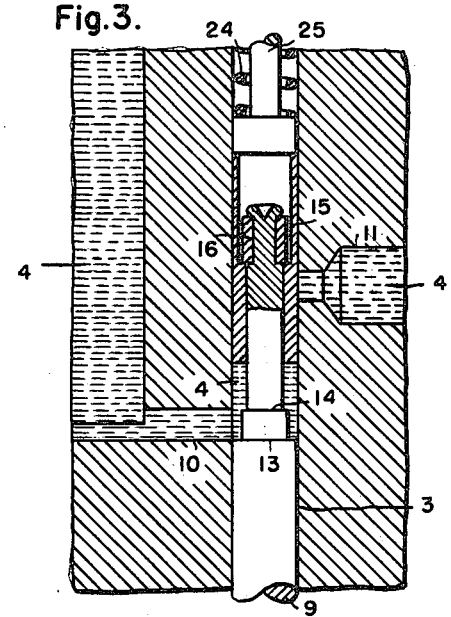
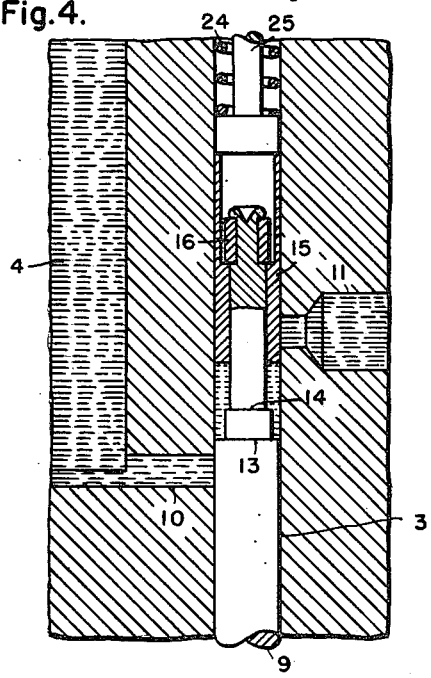
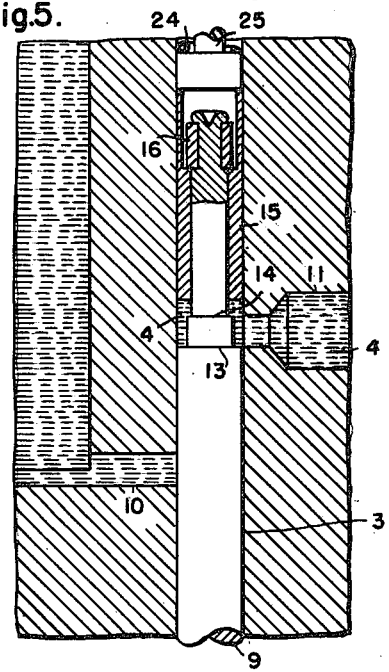
INVENTORS
Charles A. Murphy and
Jerry B. Cunningham.
ATTORNEY

United States Patent Office 2,817,417
Patented Dec. 24, 1957

2,817,417
AUTOMATIC INJECTION LUBRICATOR

Jerry B. Cunningham, Grosse Pointe, Mich., and Charles A. Murphy, Saratoga, Calif., assignors, by mesne assignments, to the United States of America as represented by the Secretary of the Navy Application January 21, 1954, Serial No. 405,360

8 Claims. (Cl. 184—27)

This invention relates generally to lubricators of the force-feed type.

One object of this invention is to provide a lubricator which will positively inject a measured quantity of lubricant to a desired point during each operating cycle of the lubricator.

Another object of this invention is to provide means to measure a desired quantity of lubricant and deliver it to a desired point during each operating cycle of the lubricator.

Yet another object of this invention is to provide a lubricator of the character referred to wherein exceedingly small quantities of lubricant may be discharged per operating cycle of the lubricator and wherein the quantity of lubricant discharged is readily adjustable.

The objects stated are merely illustrative, these and other objects will become more apparent from a study of the following description and accompanying drawings in which:

Figs. 2, 3, 4 and 5 show sectional views through the plunger guide for various positions of the plunger in its operating cycle.

Figure 1:
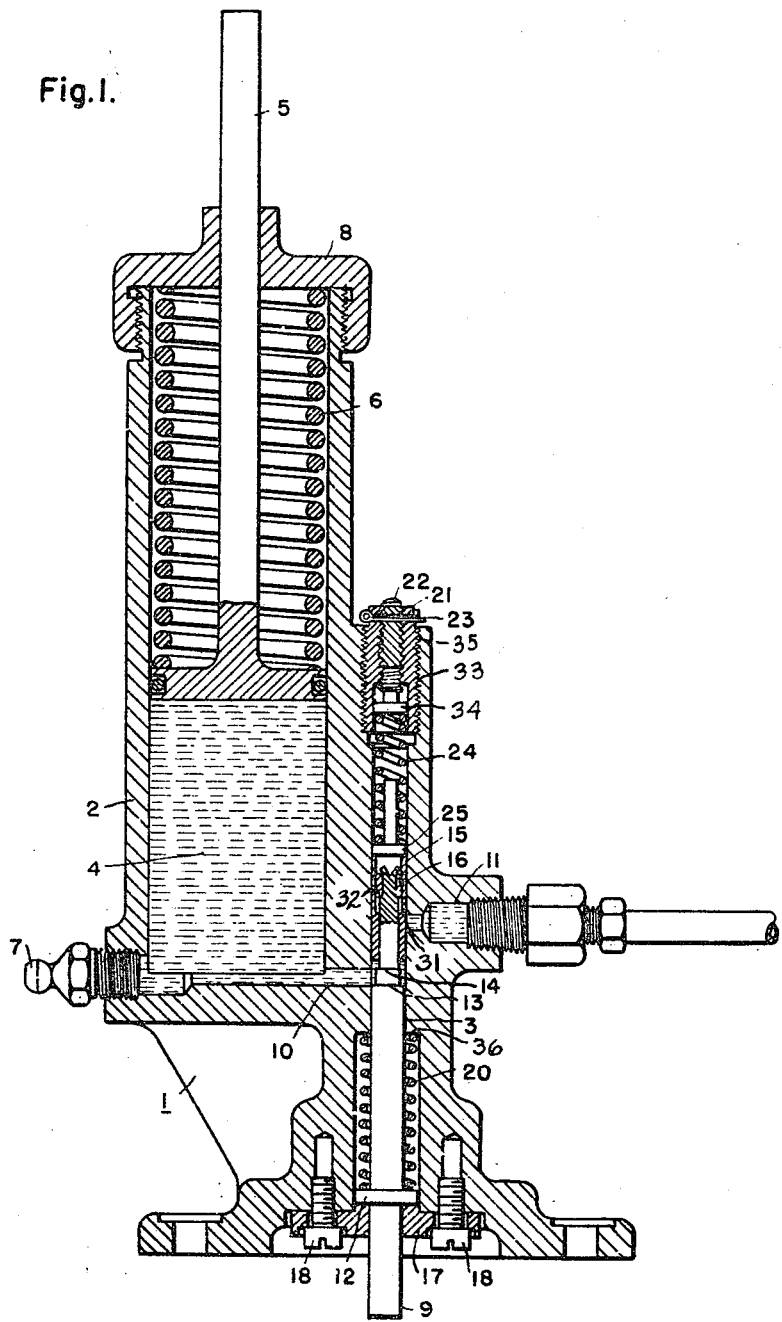
Figure 1 shows a longitudinal sectional view through the lubricator.

The lubricator base 1 is shown as a unitary cast member which supports the lubricant receptacle 2 and the plunger guide 3. The lubricant receptacle or reservoir 2 contains the lubricant 4 which is kept under pressure by means of the piston 5 acted on by the force provided by the compression spring 6 disposed between the bottom surface of the threaded cap 8 and the top surface of the piston 5. The lubricant in reservoir, when depleted, may readily replenished through fitting 7.

The plunger guide 3 in the base 1 is bored to snugly but slidably receive the cylindrical plunger 9. The plunger guide bore is in fluid communication with a receiving passage 10 for receiving lubricant from the reservoir 2 and a discharge passage 11 through which the lubricant is ejected. The plunger 9 has a flange 12, disposed in the position shown. The upper end of plunger 9 is turned down in three steps to provide three upwardly facing annular ledges or shoulders 13, 14 and 32 respectively.

A sleeve 15 is dimensioned to provide a slidable fit with both the intermediate reduced diameter portion of the plunger 9 and the bore of plunger guide 3. Sleeve 15, which normally seats or rests on the ledge 14, is of a predetermined length somewhat greater than the combined lengths of the upper two cylindrical turned-down portions of plunger 9, and is step bored to provide a sliding fit with the outer cylindrical portion of a collar 16.

The uppermost, or smallest diameter portion of plunger 9, receives the collar 16 which may be fixed to prevent relative movement with respect to the end portion of plunger 9 in any suitable manner as by riveting or peening-over the rod end of plunger 9, thereby to maintain collar 16 seated against the shoulder at 32. The outer diameter of collar 16 is greater than the diameter of the next adjacent turned-down portion of the plunger.

The sleeve 15 may thus be slidably moved on plunger 9 from its position of rest on ledge 14 to a position where ledge 31 engages the bottom of collar 16.

The plunger 9 is fitted into the plunger guide 3 and held in by means of the bushing 17 which is fixed to the base 1 by screws 18. The flange 12 is designed to rest against the bushing 17 to maintain the plunger 9 in the plunger guide 3. A compressor spring 20 fits between the flange 12 on the plunger 9 and a shoulder 36 in the plunger guide 3 of the lubricator base 1 and biases the plunger 9 toward its lower position.

The upper end of the plunger guide is provided with an enlarged bore portion which is internally threaded to receive the member 33. The member 33 is provided with an internally threaded bore to receive the screw 22, and an enlarged counterbore which receives the piston-like end 34 of screw member 22. Additionally, the counterbore serves as an upper guide for spring 24. The upper end of screw 22 is provided with a transverse hole for reception of a cotter pin 23. An internally threaded sleeve or nut 21 is assembled on the outer end of screw 22. The cotter pin 23 provides a lower limit to the extent of travel of the nut 21 on screw 22, and when the short end of the cotter key is bent upwardly as shown, to engage the peripheral face of the nut or sleeve 21, the assembled position of this nut is fixed with respect to the end of screw 22. In the position shown in Fig. 1 the cotter key functions to limit the inward travel of the screw 22 by virtue of the engagement thereof with the upper face of member 33. Thus, it will be apparent from the foregoing and Fig. 1 of the drawing that the screw 22 may be withdrawn or moved upwardly to a position wherein the piston-like end 34 seats against the countersurface of the counterbore in which portion 34 is received.

This arrangement permits of adjustment of the compressive loading on spring 24 as the nut 21, which is locked to screw 22 by cotter pin 23, is rotated with screw 22 in a direction to withdraw screw 22 and move nut 21 away from the upper end face of member 33.

It will be further apparent that the compressive bias or loading force applied to spring 24 will provide a reactive component which will tend to maintain or lock the screw threads of screw 22 against the internal threads of member 33 in much the same manner of function as accomplished by a conventional lock washer. Thus, the adjusted position of piston-like portion 34 will be maintained during operation of the device even though nut 21 and its locking cotter key 23 are moved away from the outer end of member 33.

The lower face of piston-like end portion 34 of screw 22 abuts the upper end of a light sleeve biasing compression spring 24. The lower end of the sleeve biasing spring 24 rests upon the spring seat 25. The spring seat 25 has its upper portion turned down so that the sleeve biasing spring 24 will fit around it. The spring seat 25 and the piston-like end 34 of the screw 22 form the means for stopping the upward motion of the sleeve 15 when the plunger 9 is reciprocating in its guide 3.

The lubricator is designed so that the energy for the injection process is derived from the machine on which the lubricator is installed, that is, the machine on which the lubricator is installed through suitable means furnishes the thrust which pushes the plunger 9 upwardly in its guide 3. The biasing spring 20 will force the plunger 9 back down when the thrust on the plunger 9 is released. The operation of the lubricator is better understood by reference to an operating cycle, positions of which are illustrated in Figs. 2, 3, 4 and 5.

In Fig. 3 the plunger 9 is shown in its lowermost position and the lubricant under pressure in reservoir 2 has forced the sleeve 15 upward so that ledges 31 and 32 engage each other and a fixed amount of lubricant, in the shape of sleeve-like slug, is disposed between the bottom of sleeve 15 and ledges 13 and 14.

Fig. 2 shows the plunger at the lower end of its cycle as is shown in Fig. 1. The lubricant charge pocket is just forming in the space around the plunger 9 between the ledges 13 and 14 on the plunger 9 and the lower end of the sleeve 15. It has been pointed out that if the sleeve 15 is at its lowest point its lower end will rest upon the ledge 14. Thus there is space for the selected amount of lubricant from the receiving passage 10 to force its way around portions of the plunger 9. Since the lubricant 4 in the lubricator reservoir is under pressure and since this sleeve biasing spring 24 is relatively light, the sleeve 15 will be forced upward by the lubricant from the receiving passage 10 until the ledge 31 of the sleeve 15 rests against the bottom of collar 16 on the end of the plunger 9. This condition is illustrated in Fig. 3. As the plunger is forced upward, the plunger shears the lubricant off clean at the receiving passage 10 and a definite amount of the lubricant is trapped around the plunger 9 between the ledge 13 and the lower end of the sleeve 15. This is shown in Fig. 4.

To provide a better understanding of the function of the lubricator a more detailed analysis of the operation with reference to Fig. 4 may be helpful.

When the plunger 9 moves up, the lubricant pressure in reservoir 2 maintains the relative position of plunger 9 and sleeve 15 until plunger 9 shears off the fixed slug of lubricant at receiving passage 10. Since the liquid is substantially noncompressible, the plunger 9, slug of lubricant, sleeve 15, and spring seat 25 move upwardly as a rigid unit and effect a compression of spring 24 as the upper end of the spring seat 25 approaches the piston-like lower end 34 of screw 22. This movement continues until the upper end of spring seat 25 engages end 34. Now the spring seat 25 and sleeve 15 stop their upward movement but the plunger 9 continues its upward movement. In the meantime the slug of lubricant has moved opposite the left-hand end of passage 11. Since the sleeve 15 has stopped its upward movement, the slug of lubricant is now subjected to a pressure exerted by compressed spring 24 through sleeve 15 to force sleeve 15 downwardly with the entrapped lubricant to expel a fixed amount thereof into discharge passage 11 as shown in Fig. 5.

The screw 22, as shown in Fig. 1, is adjusted to expel the minimum amount of lubricant. When the maximum quantity of fluid is to be expelled, as shown in Figs. 3 and 4, the screw 22 is adjusted upwardly by means of the nut or sleeve 21 fixed thereto to reduce the initial loading on spring 24 and permit the lubricant 4 under the pressure of spring 6 in reservoir 2 to displace the sleeve 15 upwardly until the step-bore shoulder at 31 seats against the shoulder provided by the lower exposed annular face of collar 16.

It will be apparent from the foregoing that the spring 24 must provide sufficient force to overcome any tendency of the lubricant under the pressure influences of spring 6 to displace sleeve 15 by an amount greater than that desired. An operable approximation of this relationship is shown in Figs. 1 and 2. The operating range by which movement of screw 22 is effective to provide adjustment of the quantity of discharge is necessarily dependent on the relative characteristics of springs 6 and 24. The optimum range of adjustment may be obtained by a suitable selection of springs to provide the required force ratio.

From the foregoing, it is apparent that very fine adjustments within a given range may be made of the amount of lubricant to be expelled.

In Fig. 5 the charge pocket is at a level with the discharge passage 11 and part of the desired quantity of lubricant has been ejected. The upward thrusting action on the plunger 9 is then relieved by the actuating means of the machine which provides the lifting thrust therefor, and the compression spring 20 returns plunger 9 to its normal position with flange 12 seated against bushing 17. The return of sleeve 15 by action of spring 24 follows movement of plunger 9 and shears the lubricant off clean at the discharge passage 11. This action together with the return of plunger 9 to its lower position again places the charge pocket flush with the intake, or receiving passage 10, and the cycle may be repeated. The light sleeve biasing spring 24 insures the return of the sleeve 15 and the spring seat 25 with the plunger 9 thereby preventing feedback of the ejected lubricant.

The objects of this invention have been accomplished by providing a lubricator wherein the quantity of lubricant discharged is readily adjustable, the lubricant is discharged by positive displacement, exceedingly small quantities of lubricant may be discharged per cycle of the lubricator, the unit lubricates only when the machine that it is mounted on is in operation, and the lubricant is sheared off clean at both the receiving and discharge passages.

While in accordance with the patent statutes one best known embodiment of this invention has been illustrated and described, it is to be particularly understood that the invention is not limited thereto or thereby but equivalents are clearly within the inventive scope.

We claim as our invention:

1. In a lubricating apparatus, the combination of a lubricant receptacle; means for maintaining the lubricant in the receptacle under pressure, a plunger guide having receiving and discharge passages therein, the receiving passage for said plunger guide being connected to said receptacle; a plunger mounted to be reciprocated longitudinally in said plunger guide, said plunger being of smaller diameter for a selected distance near one end with an annular ledge forming the boundary between the portions of different diameters, a sleeve slidably received in said guide and disposed in spaced relation to said annular ledge for sliding movement on the portion of said plunger of the lesser diameter and adapted for movement relative to the plunger by fluid pressure acting between the sleeve and ledge to form a charge pocket, means to stop movement of the sleeve on the plunger to determine the maximum size of the charge pocket; and sleeve stop means threaded in one end of said plunger guide comprising, a screw member threaded in said plunger guide, a spring member, and a spring seat, said spring member being between said spring seat and said screw member and biasing said spring seat against said sleeve to bias the sleeve toward the closed position of the charge pocket; said charge pocket being in alignment with the receiving passage when the plunger is at its normal position, so that the sleeve will be moved relative to the plunger and the charge pocket will be filled, said charge pocket being displaceable with upward travel of said plunger to a position in alignment with the discharge passage, said sleeve being movable contemporaneously with plunger travel until stopped by the spring seat member making contact with the screw member and thereafter independently spring urged to decrease the volume of said charge pocket and force lubricant into said discharge passage as the plunger approaches the normal position thereof.

2. In a lubricating apparatus, the combination of a lubricant receptacle having means to maintain the lubricant under pressure; a plunger guide having receiving and discharge passages therein, the receiving passage for said plunger guide being connected to said receptacle, a plunger mounted to be reciprocated longitudinally in said plunger guide, said plunger being of smaller diameter for a selected distance near one end with an annular ledge forming the boundary between the portions of different diameters, a sleeve slidably received in said guide and disposed in spaced relation to said annular ledge for sliding movement on the smaller diameter portion of said plunger adapted for movement relative to the plunger by fluid pressure acting between the sleeve and ledge to form a charge pocket, means to stop movement of the sleeve on the plunger to determine the maximum size of the charge pocket, spring biased sleeve stop means at one end of said plunger guide, said charge pocket being normally in alignment with the receiving passage at one end of the plunger travel so that the sleeve will be moved relative to the plunger by the force applied to the lubricant and the charge pocket will be filled, said charge pocket being movable into alignment with the discharge passage during plunger travel and said sleeve being stopped against said sleeve stop means and urged to decrease the volume of said charge pocket and force the lubricant into said discharge passage as the plunger approaches the return end of its travel.

3. In a lubricating apparatus, the combination of a lubricant receptacle having means to maintain the lubricant under pressure; a plunger guide having receiving and discharge passages therein, the receiving passage for said plunger guide being connected to said receptacle, a plunger mounted to be reciprocated longitudinally in said plunger guide, said plunger being of smaller diameter for a selected distance near one end with an annular ledge forming the boundary between the portions of different diameters, a sleeve slidably received in said guide and disposed in spaced relation to said annular ledge for sliding movement on one end of said plunger and adapted for movement relative to the plunger by fluid pressure acting between the sleeve and ledge to form a charge pocket, means to stop movement of the sleeve on the plunger to determine the maximum size of the charge pocket, a spring biased sleeve stop means disposed at one end of said plunger guide, said charge pocket being normally in alignment with the receiving passage at the normal position of the plunger so that the sleeve will be moved relative to the plunger by the lubricant under pressure and the charge pocket will be filled, said charge pocket being movable during plunger travel into alignment with the discharge passage and said sleeve being stopped against said sleeve stop means and returned thereby to decrease the volume of said charge pocket and force the lubricant into said discharge passage as the plunger approaches the return or normal end of plunger travel, means for effecting positional adjustment of the spring biased sleeve stop means to variably preset the amount of lubricant discharged from the charge pocket.

4. In a lubricating apparatus, the combination of a lubricant receptacle having means to maintain the lubricant under pressure; a plunger guide having receiving and discharge passages therein, the receiving passage for said plunger guide being connected to said receptacle; and a plunger mounted to be reciprocated longitudinally in said plunger guide, said plunger being of smaller diameter for a selected distance near one end with an annular ledge forming the boundary between the portions of different diameters, a sleeve on said one end of said plunger disposed in spaced relation to said annular ledge and adapted for movement relative to the plunger by fluid pressure acting between the sleeve and ledge to form a charge pocket, means to stop relative movement of the sleeve on the plunger to determine the maximum size of the charge pocket; sleeve stop means at one end of said plunger guide comprising, a screw member threaded in said plunger guide, a spring member, and a spring seat, said spring member being between said spring seat and said screw member and biasing said spring seat against said sleeve to bias the sleeve toward the normal position of the charge pocket; said charge pocket being in alignment with the receiving passage when the plunger is at its normal position so that the sleeve will be moved relative to the plunger by the lubricant and the charge pocket will be filled, said charge pocket being movable contemporaneously with the plunger travel into alignment with the discharge passage and the sleeve being stopped by the spring seat member making contact with the screw member, said sleeve being thereafter spring urged to decrease the volume of said charge pocket and force lubricant into said discharge passage as the plunger approaches the normal position thereof.

5. In a lubricating apparatus, the combination of a lubricant receptacle; means for maintaining the lubricant in the receptacle under pressure, a plunger guide having receiving and discharge passages therein, the receiving passage for said plunger guide being connected to said receptacle; and a plunger mounted to be reciprocated longitudinally in said plunger guide, said plunger being of smaller diameter for a selected distance near one end with an annular ledge forming the boundary between the portions of different diameters, a sleeve disposed in spaced relation to said annular ledge on said one end of said plunger and adapted for movement relative to the plunger by fluid pressure acting between the sleeve and ledge to form a charge pocket, means to stop relative movement of the sleeve on the plunger to determine the maximum size of the charge pocket, sleeve stop means at one end of said plunger guide comprising, a screw member threaded in said plunger guide, biasing means between said screw member and said sleeve to bias the sleeve toward the closed position of the charge pocket; said charge pocket being normally in alignment with the receiving passage when the plunger is at its normal position so that the sleeve will be moved relative to the plunger by the lubricant under pressure and the charge pocket will be filled, said charge pocket being movable during plunger travel to a position in alignment with the discharge passage and the sleeve being stopped by the sleeve stop means and urged by said biasing means to decrease the volume of said charge pocket and force lubricant into said discharge passage with plunger return movement to its normal position.

6. In a lubricating system, in combination, a base, a lubricant reservoir containing lubricant under pressure, a cylindrical elongated plunger guide chamber, a receiving passage placing the guide chamber in communication with the reservoir, a plunger mounted for reciprocation in said guide chamber, said plunger having a reduced diameter end, a sleeve slidably mounted in spaced relation to the full diameter portion of said plunger for limited longitudinal movement on the reduced diameter end of the plunger to provide a lubricant charge pocket between the thicker portion of the plunger and the adjacent end of the sleeve, a lubricant discharge passage, spaced from said receiving passage, said plunger having two operative positions, in one position the thicker portion of the plunger registering with the lower edge of the receiving passage and in the second position the thicker portion of the plunger being in adjacency with the discharge passage, the relationship between the sleeve and thicker portion of the plunger being such that in the first position the lubricant under pressure in the reservoir moves the sleeve to a position to fill the charge pocket, and spring biased stop means in abutting relation to the sleeve to effect a decrease in volume of the charge pocket in response to spring urging of said sleeve by said stop means when the plunger is moved to its second operative position.

7. In a lubricating system, in combination, a base, a lubricant reservoir containing lubricant under pressure, a cylindrical elongated plunger guide chamber, a receiving passage placing the guide chamber in communication with the reservoir, a plunger mounted for reciprocation in said guide chamber, said plunger having a reduced diameter end, a sleeve slidably mounted for longitudinal movement on the reduced diameter end of the plunger, means for limiting relative movement of said sleeve with respect to the step provided at the shoulder occurring at a step diameter portion of said plunger whereby a lubricant charge pocket is provided between the thicker portion of the plunger and the adjacent end of the sleeve, a lubricant discharge passage, spaced from said receiving passage, said plunger having two operative positions, in one position the thicker portion of the plunger registering with the lower edge of the receiving passage and in the second position the thicker portion of the plunger registering with the lower edge of the discharge passage, in the first position the lubricant under pressure in the reservoir moving the sleeve to its end position to fill the charge pocket, stop means disposed at one end of said plunger guide chamber and including a biasing means for the sleeve to effect a decrease in volume of the charge pocket when the plunger is moved to its second operative position, and means for adjusting the stop means to vary the decrease in volume of the charge pocket.

8. In a lubricating apparatus, the combination of a lubricant receptacle, means for maintaining the lubricant in the receptacle under pressure, a plunger guide means having lubricant receiving and discharge passages therein, the receiving passage for said plunger guide being connected to said receptacle, a plunger slidably mounted for longitudinal movement in said plunger guide, said plunger being of successively decreasing cross-sectional area for a plurality of discrete distances along one end thereof to provide a plurality of stepped-ledges defined by mutually adjacent stepped rod-like portions of said plunger, a sleeve member disposed between a rod-like portion of said plunger and the bore of said plunger guide for slidable movement with respect to said plunger and guide by fluid pressure applied to act on one end of said sleeve member, the end of said sleeve member and the largest of the said stepped rod-like portions of the plunger defining a charge pocket which is normally disposed in fluid communication with said receiving passage to be filled therefrom, means including an enlarged stepped bore in said sleeve and a member carried by the outermost rod-like stepped portion of said plunger for limiting travel of said sleeve with respect to said plunger, sleeve stop means including a resilient sleeve biasing member disposed at one end of said plunger guide, said plunger and sleeve being effective upon simultaneous movement thereof to load said biasing member and displace said charge pocket into aligned relation with said discharge passage, said sleeve biasing member being operative when loaded by movement of said sleeve to its stopped position to effect return movement of said sleeve with respect to said plunger to decrease the volume of said charge pocket and force lubricant into said discharge passage, and sleeve stop adjustment means for effecting a variation in the amount of lubricant discharged from the charge pocket.

References Cited in the file of this patent

UNITED STATES PATENTS

| | | |
|---|---|---|
| 817,997 | Spade | Apr. 17, 1906 |
| 890,616 | Davis | June 16, 1908 |
| 1,048,914 | Thomas | Dec. 31, 1912 |
| 1,990,408 | Kerst | Feb. 5, 1935 |